US010828946B2

(12) United States Patent
Ramsubagh et al.

(10) Patent No.: US 10,828,946 B2
(45) Date of Patent: Nov. 10, 2020

(54) PRESSURE MEASURING CAP (71) Applicants: Nigel Ramsubagh, Montgomery, TX (US); Carmen Ramsubagh, Montgomery, TX (US); Allen Nejah, San Jose, CA (US)

(72) Inventors: Nigel Ramsubagh, Montgomery, TX (US); Carmen Ramsubagh, Montgomery, TX (US); Allen Nejah, San Jose, CA (US)

(73) Assignee: Nigel Ramsubagh, Montgomery, TX (US)

(*) Notice: Subject to any disclaimer, the term of this patent is extended or adjusted under 35 U.S.C. 154(b) by 0 days.

(21) Appl. No.: 16/532,360

(22) Filed: Aug. 5, 2019

(65) Prior Publication Data
US 2019/0359015 A1 Nov. 28, 2019

Related U.S. Application Data (63) Continuation-in-part of application No. 16/002,805, filed on Jun. 7, 2018, now abandoned, which is a continuation-in-part of application No. 15/346,272, filed on Nov. 8, 2016, now abandoned.

(51) Int. Cl.
*B60C 23/04* (2006.01)
*B60C 29/00* (2006.01)

(52) U.S. Cl.
CPC ........ *B60C 23/0496* (2013.01); *B60C 29/002* (2013.01); *B60C 29/005* (2013.01); *B60C 23/0494* (2013.01)

(58) Field of Classification Search
None
See application file for complete search history.

(56) References Cited

U.S. PATENT DOCUMENTS

| | | | |
|---|---|---|---|
| 1,038,803 A | 9/1912 | Vaughan | |
| 1,156,268 A | 10/1915 | Bromberg | |
| 2,903,888 A | 9/1959 | Gfoll | |
| 3,177,724 A | 4/1965 | Trinca | |
| 3,572,283 A * | 3/1971 | Ashman | B60C 23/0496 116/34 R |

(Continued)

OTHER PUBLICATIONS

Office Action in related U.S. Appl. No. 15/346,272, dated Jun. 29, 2018, 8 pages.

(Continued)

*Primary Examiner* — Jill E Culler
(74) *Attorney, Agent, or Firm* — Law Office of Jeff Williams PLLC; J. Oliver Williams (57) ABSTRACT

A valve stem system includes a valve stem that is fluidly coupled to a tire thereby facilitating the valve stem to selectively inflate and deflate the tire. A sensing unit is coupled to the valve stem and the sensing unit is visible on the valve stem. The sensing unit is in fluid communication with the valve stem to sense air pressure within the tire thereby facilitating the sensing unit to display the air pressure within the tire. A valve stem assembly includes a pressure sensing body and a valve core configured to threadedly engage the tire stem and regulate air flow from a tire. The pressure sensing body includes plunger that responds to pressure fluctuations in the tire and provides a continuous measurement of air pressure.

17 Claims, 8 Drawing Sheets

(56) References Cited

U.S. PATENT DOCUMENTS

| | | | |
|---|---|---|---|
| 3,670,688 A | * | 6/1972 | Seaberg .................. G01L 17/00 |
| | | | 116/34 R |
| 3,866,563 A | | 2/1975 | Bluem |
| 4,072,048 A | | 2/1978 | Arvan |
| 4,464,929 A | | 8/1984 | Willis |
| 4,901,747 A | | 2/1990 | Yabor |
| 4,986,128 A | | 1/1991 | Burns |
| 5,103,670 A | | 4/1992 | Wu |
| 6,561,212 B1 | | 5/2003 | Hsu |

OTHER PUBLICATIONS

Office Action in related U.S. Appl. No. 16/002,805, dated 5 Apr. 2019, 7 pages.

* cited by examiner

PRESSURE MEASURING CAP

CLAIM OF PRIORITY

This application claims the benefit of and is a Continuation-in-part of U.S. Non-Provisional application Ser. No. 16/002,805, filed 7 Jun. 2018, which is a Continuation-in-part of U.S. Non-Provisional application Ser. No. 15/346,272, filed 8 Nov. 2016. The information contained therein is hereby incorporated by reference.

BACKGROUND

1. Field of the Invention

The present application relates to a tire pressure indicator, and more particularly, a new valve stem device for displaying and monitoring air pressure in a tire that is retrofittable to any tire acting separate from tire pressure monitoring systems.

2. Description of Related Art

Maintaining proper tire pressure is important to achieving optimum vehicular performance and minimizing operating costs. Vehicles with over- or under-inflated tires generally suffer from impaired braking and handling (e.g. front-end shimmy, pulling to one side). This in turn poses a safety risk since the vehicle may not comer or decelerate effectively. Indeed, it is estimated that under-inflated tires contribute to approximately 260,000 accidents per year. Additionally, many motorists get stranded on busy highways and deserted rural roads due to blowouts partially caused by improperly inflated tires.

Improper inflation also results in accelerated tire tread wear and increased fuel consumption. Industry studies show that fuel savings of 5% or more are achievable when tires are run at their proper operating pressure. Furthermore, maintaining proper tire pressure can provide 20% more miles of tread life. Consequently, proper tire inflation saves the user money as well as being beneficial to the environment by reducing fossil fuel consumption, emissions, and the number of used tires that need to be disposed. Additionally, individuals often spend unnecessary time and money believing that they need car repairs, such as an alignment, when in actuality their tires are improperly inflated.

Tire pressure monitoring systems have become standard on a number of vehicles since the turn of the century. These monitor the tire pressure in a tire and provide a warning to the driver when it gets low. These are typically internally mounted in the tire and have to be replaced at tire changes. Apart from expensive integrated monitoring systems, it is difficult to keep a regular check on the tire pressure without going to the filling station.

Standard tire valve stems simply house a valve that allows air to flow into and out of the tire. Typical devices used to check tire pressure manually rely upon the device to release a level of air into a channel to push a stick or provide an indicator as to the pressure level. These are usually performed multiple times to ensure an accurate reading. Between each reading the device has to be removed and reapplied. This gets awkward as ensuring proper alignment can be difficult, which is partly why multiple tries and readings are necessary.

These existing valve stem mechanisms neither regulate nor measure and display the tire's air pressure to the user. Indeed, a separate tire pressure gauge must be employed to ascertain a tire's pressure, and this measurement must be compared with the manufacturer's recommendation. This requires extra effort on the part of motorists who are often unaware or unconcerned about the significance of proper tire inflation. Also, if the tire pressure gauge is not used or calibrated correctly, the user may inadvertently release air pressure from the tire or the pressure measurement may be incorrect, thereby exacerbating attempts to achieve the recommended pressure. Furthermore, many motorists do not check their tire pressure regularly and many may not even know how to locate the manufacturer's recommendation.

Although strides have been made to assist drivers with maintaining and checking for proper air pressure in car tires, shortcomings remain. It is desired that an assembly be provided that automatically prevents inadvertent over-inflation by automatically releasing excess tire pressure until the proper pressure remains. Additionally that an assembly replace the cap on the tire stem and automatically measure and provide a visual indication of the pressure in the tire at any moment.

SUMMARY OF THE INVENTION

An embodiment of the disclosure meets the needs presented above by generally comprising a valve stem device that is fluidly coupled to an existing tire valve stem thereby facilitating the valve stem device to selectively inflate and deflate the tire. The device is configured to display a visible indication to a user related to pressure within the tire. The device is in fluid communication with the valve stem to sense air pressure within the tire thereby facilitating the device to display the air pressure within the tire.

It is a further object of the present application to make the tire pressure monitoring accessible to the consumer who does not want to buy a new car with existing tire pressure sensors or to install an expensive sensor in the tire. The present valve assembly is screwed on top of an existing tire stem valve in place of the valve cap. The valve assembly will be available in a standard size and provide a continuous reading of air pressure in the tire. The cap would not need to be removed to fill the tire through the tire stem.

Ultimately the invention may take many embodiments. The more important features of the assembly have thus been outlined in order that the more detailed description that follows may be better understood and to ensure that the present contribution to the art is appreciated. Additional features of the system will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the assembly in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present assembly.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe the assembly of the present application and its associated features. With reference now to the Figures, an embodiment of the valve stem system and assembly, and method of use are herein described. It should be noted that the articles "a", "an", and "the", as used in this specification, include plural referents unless the content clearly dictates otherwise.

With reference now to the drawings, and in particular to FIGS. 1 through 4 thereof, a new valve stem device embodying the principles and concepts of an embodiment of the disclosure and generally designated by the reference numeral 10 will be described.

As best illustrated in FIGS. 1 through 4, the valve stem system 10 generally comprises a valve stem 12 that is fluidly coupled to a tire 14 thereby facilitating the valve stem 12 to selectively inflate and deflate the tire 14. The tire 14 may be an inflatable tire that is positioned on a vehicle or the like. The vehicle may be a truck, a car, a motorcycle, a trailer or any other vehicle that has inflatable tires. The valve stem 12 may be a tire valve stem 12 of any conventional design.

The valve stem 12 has an outer wall 16 and a chamber 18. The chamber 18 extends longitudinally through the valve stem 12 and the chamber 18 is in fluid communication with an interior of the tire 14. The valve stem 12 is comprised of a fluid impermeable material such as steel or the like. A sleeve 20 is provided and the sleeve 20 is positioned around the valve stem 12. The sleeve 20 is comprised of a fluid impermeable material such as rubber or the like.

A sensing unit 22 is provided and the sensing unit 22 is coupled to the valve stem 12. The sensing unit 22 is positioned to be visible on the valve stem 12. The sensing unit 22 is in fluid communication with the valve stem 12 to sense air pressure within the tire 14. Thus, the sensing unit 22 may display the air pressure within the tire 14.

A gauge 24 is provided and the gauge 24 is coupled to the sleeve 20. Thus, the gauge 24 is visible to an individual. The gauge 24 includes indicia 26 that are printed on an outer surface of the sleeve 20. The indicia 26 comprise graduated pressure numbers 28 and hash marks 30 that are aligned with the graduate pressure numbers. The gauge 24 may be an air pressure gauge 24 or the like.

The gauge 24 includes an indicator 32 that is movably aligned with the indicia 26. The pressure sensor urges the indicator 32 to align with selected ones of the graduated pressure numbers 28 corresponding with air pressure in the tire 14. In this way the indicator 32 indicates the air pressure in the tire 14. The indicator 32 may be comprised of a luminescent material such that the indicator 32 glows in the dark thereby facilitating the indicator 32 to be visible at night. Moreover, the indicator 32 may be an analog pressure gauge 24 or the like.

Figure 1:
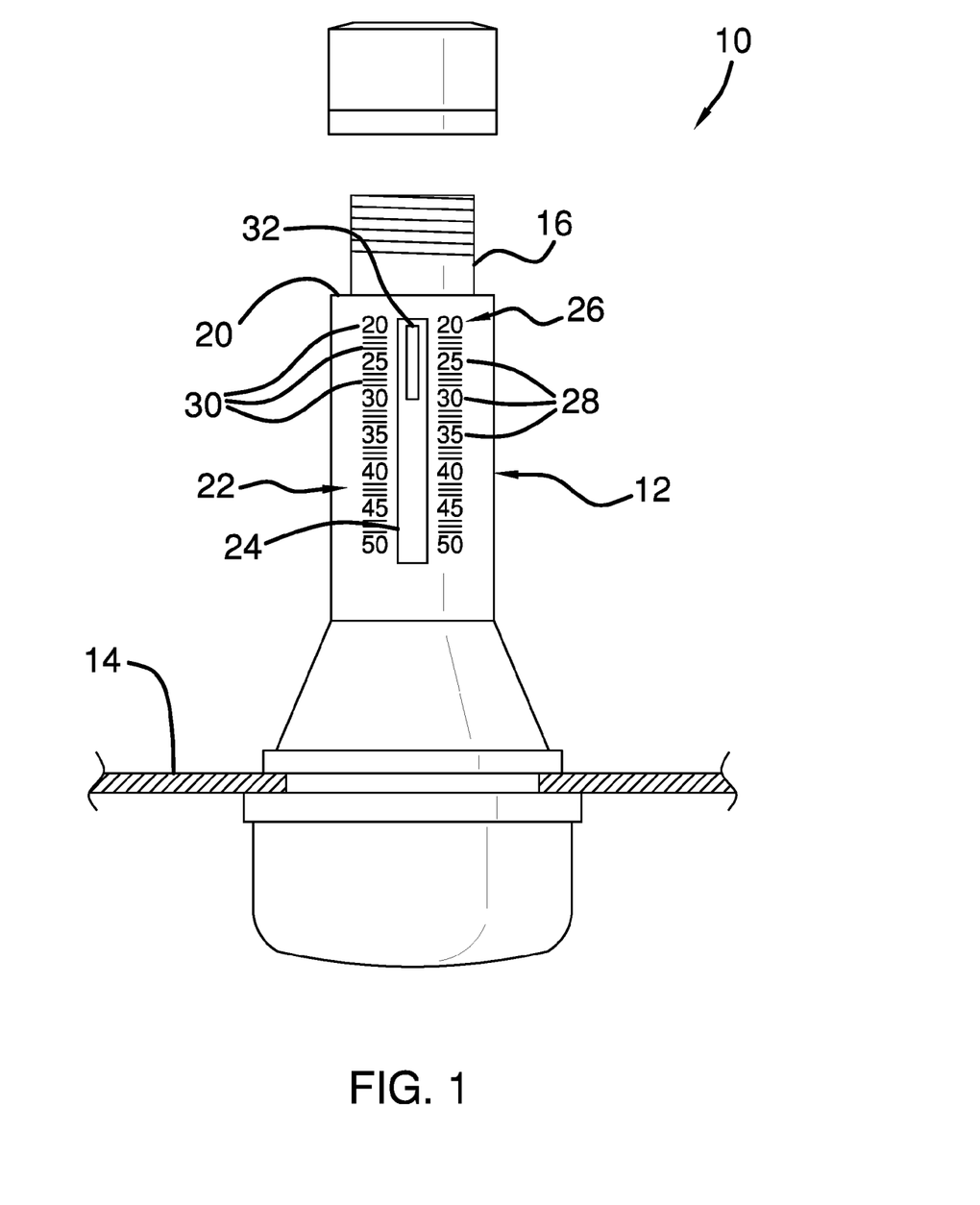
FIG. 1 is a front view of a valve stem system according to an embodiment of the present application.
Figure 2:
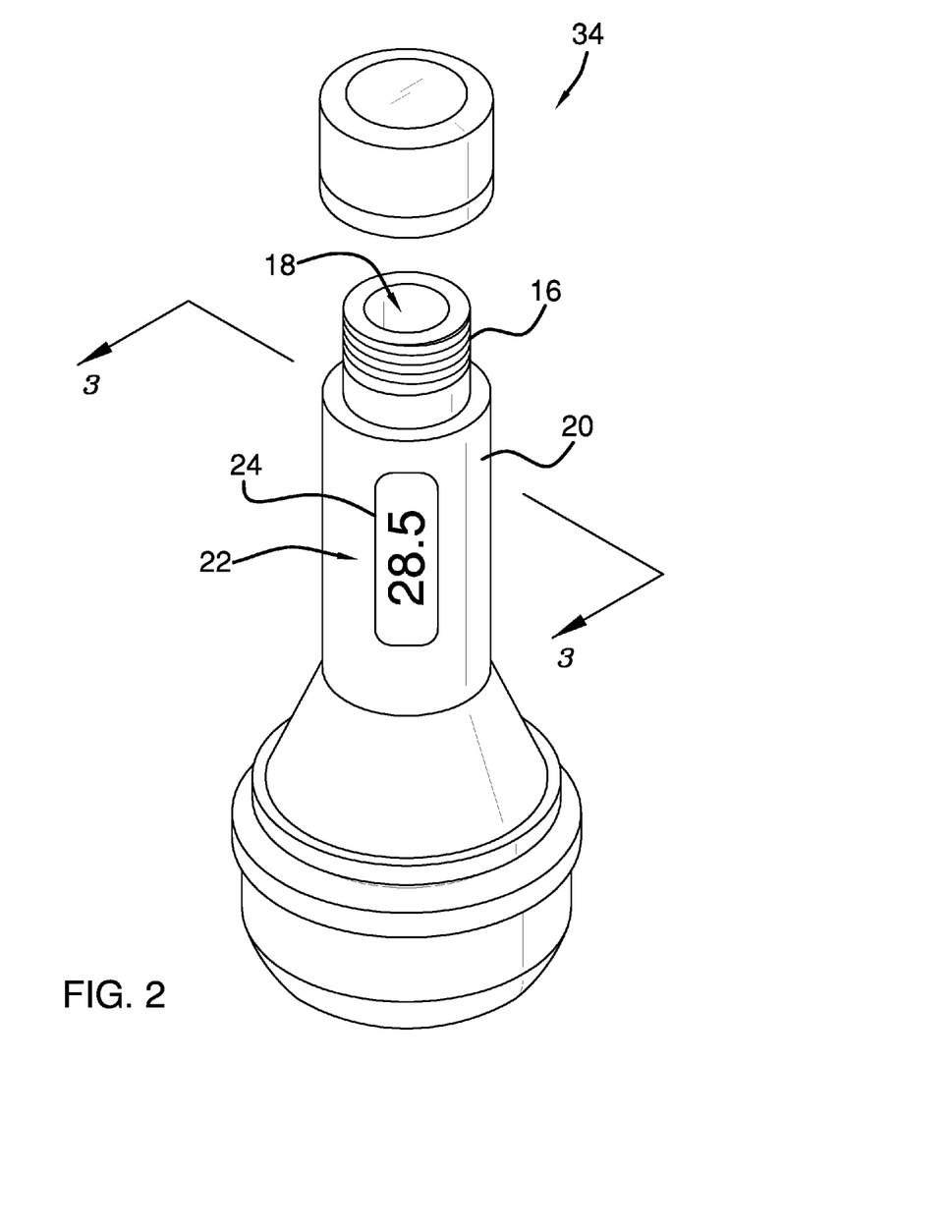
FIG. 2 is a perspective view of an alternative embodiment of the valve stem system of FIG. 1.
Figure 3:
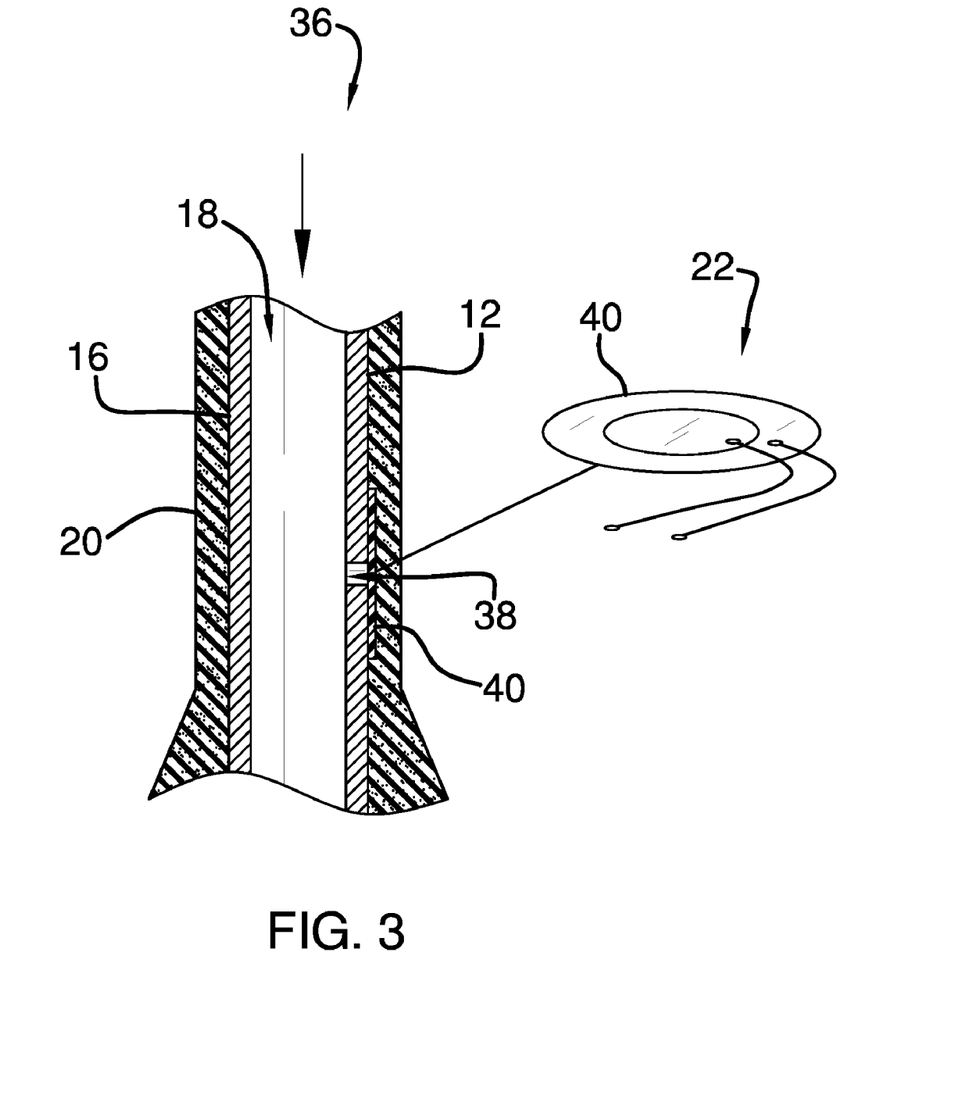
FIG. 3 is a cross sectional view taken along line 3-3 of the valve stem system of FIG. 2.
Figure 4:
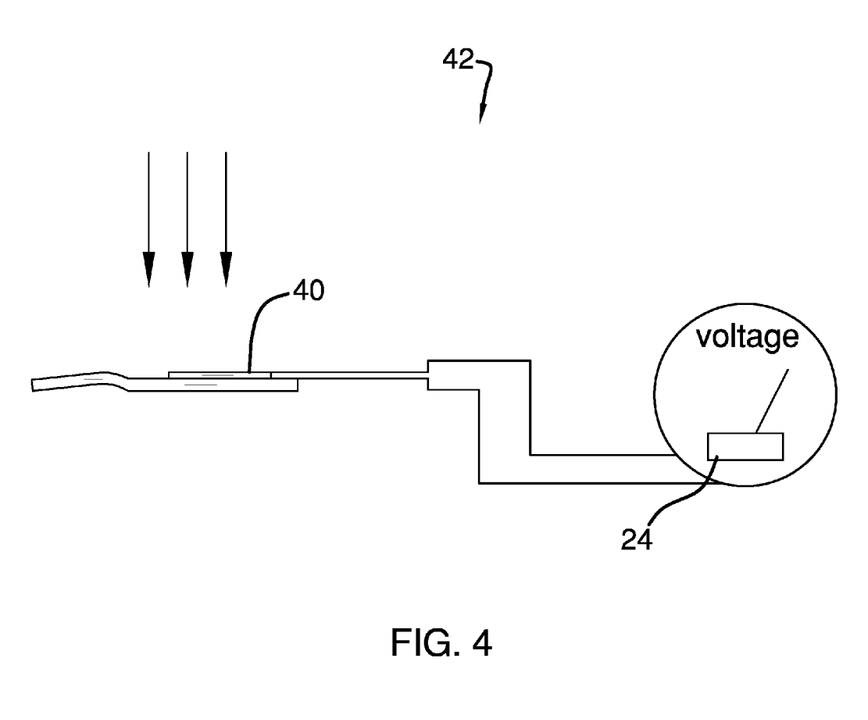
FIG. 4 is a detail view of an alternative embodiment of the valve stem system of FIG. 2.

In an alternative embodiment 34 as shown in FIG. 2, the gauge 24 may be a digital gauge or the like. In an alternative embodiment 36 as shown in FIG. 3, the outer wall 16 of the valve stem 12 may have an aperture 38 extending into the chamber 18. The sensing unit 22 may include a pressure sensor 40 that is coupled to the outer wall 16 of the valve stem 12. The pressure sensor 40 may be positioned over the aperture 38 to detect air pressure in the tire 14. Moreover, the pressure sensor 40 may be positioned between the valve stem 12 and the sleeve 20. The pressure sensor 40 may comprise a piezoelectric pressure transducer or the like. In an alternative embodiment 42 as shown in FIG. 4, the pressure sensor 40 may be electrically coupled to the gauge 24.

In use, the valve stem 12 is manipulated in the convention of valve stem 12s with respect to inflating and deflating the tire 14. The gauge 24 displays the air pressure in the tire 14 thereby facilitating the air pressure in the tire 14 to be continually monitored. Moreover, the air pressure in the tire 14 is monitored without the use of an extrinsic air pressure gauge 24.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure with respect to the valve stem system 10. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

Figure 5:
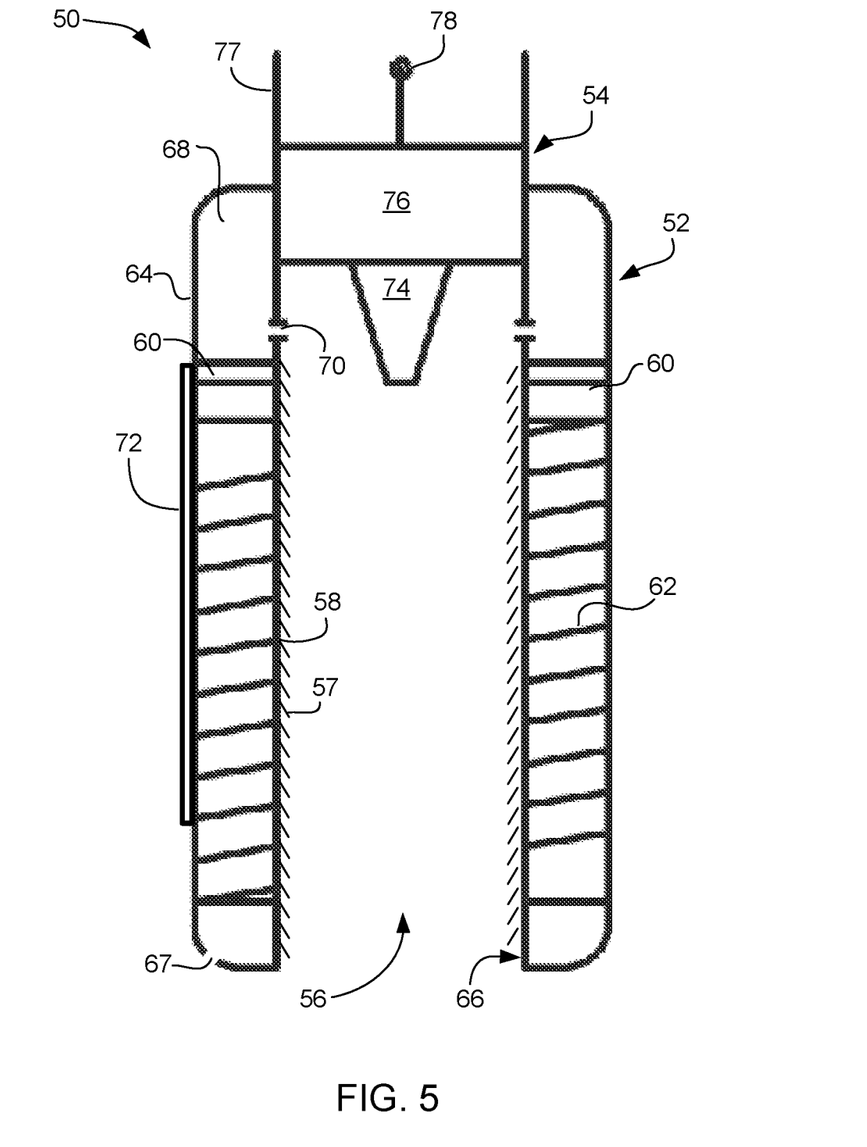
FIG. 5 is a side section view of an alternate embodiment of the valve stem system of FIGS. 1 and 2, showing a valve stem assembly.

Referring now also to FIG. 5 in the drawings, a side section view of a valve stem assembly is illustrated. Valve stem assembly 50 is configured to replace the existing cap on a tire stem and threadedly engage the tire stem of a tire. The tire is considered to be that of an automobile tire preferably, but may also work functionally with any tire having a tire stem with threaded outer engagement means. Assembly 50 is configured to provide a continuous visual indication of the pressure within the tire. Assembly 50 is also configured to engage the core of the tire stem so as to maintain the core in an open position. Assembly 50 provides for the regulation of air through the tire stem via a cap stem core.

Assembly 50 includes a pressure sensing body 52 and a valve core 54. Pressure sensing body 52 includes an internal hollowed section 56 with an internal threaded surface 58. Surface 58 is configured to engage corresponding external threads from a tire stem, similar to that of the threads typically found in a tire stem cap (not shown). The particular height of, or amount of coverage of, threads 57 along surface 58 is determined by the threads on the tire stem.

Body 52 further includes a pressure marking plunger 60 and a compression spring 62. Body 52 forms a cylindrical shape wherein the outer wall 64 and inner wall 66 form a void space 68. Within void space 68 resides plunger 60 and spring 62. Body 52 also includes at least one internal port 70 passing through inner wall 66 so as to allow equalized fluid communication between internal section 56 and void space 68. Port 70 is configured to remain an open passage that is not obstructed. Air pressure within internal section 56 should be equal to air pressure within void space 68.

Spring 62 is located beneath, or lower than, plunger 60 within void space 68. Plunger 60 acts to create a seal within body 52 such that a pressure differential exists between the volume of air above plunger 60 and that of the volume of air below plunger 60. The volume of air above plunger 60 is the air adjacent to and in communication with port 70. The volume of air below plunger 60 is the air surrounding spring 62. The spring loaded pressure marking plunger 60 will move up and down as the pressure inside the tire decreases and increases respectively. As pressure increases within void space 68 above plunger 60, the pressure forces plunger 60 downward so as to compress spring 62. As pressure is released above plunger 60, the spring 62 correspondingly biases or pushes plunger 60 upward within void space 68.

Body 52 may optionally include a viewing pane 72 in communication with outer wall 64. Pane 72 is a clear or semi-clear material (i.e. transparent) that permits light to pass through itself to enable viewing the position of plunger 60. Pane 72 may include markers to indicate corresponding air pressure within internal section 56 from the position of plunger in relation to pane 72.

Valve core 54 is coupled to an upper portion of body 52 and extends over internal section 56. Valve core 54 includes a cap stem core 74, a valve body 76 and a stem tip 78. Valve core 54 is configured to mirror or replicate the internal workings of the tire stem to some degree. The operation of valve core 54 is such that external tools may be attached to or engaged with the upper portion of core 54 to release or insert air into internal section 56. Valve core 54 includes wall 77 that extends upward to surround a portion of stem tip 78. The outer surface of wall 77 may be threaded to facilitate the optional attachment of tools or caps. Wall 77 also extends above body 52 and valve body 76.

Cap stem core 74 is configured to extend below valve body 76 into internal section 56. Cap stem core 74 is configured to be partially rigid in that compressive forces acting upward through internal section 56 do not compress it toward valve body 76. Any number of internal valve seats, passages, or ports may be included within cap stem core 74 to allow for the selective flow of air through valve body 76 into internal section 56. Stem tip 78 extends above valve body 76 and passes there through a portion of valve body 76. Compression of stem tip 78 into valve body 76 permits the passage of fluid through valve body 76 such that the air in internal section 56 is in fluid communication with the air exterior to valve body 76, above stem tip 78.

Figure 6:
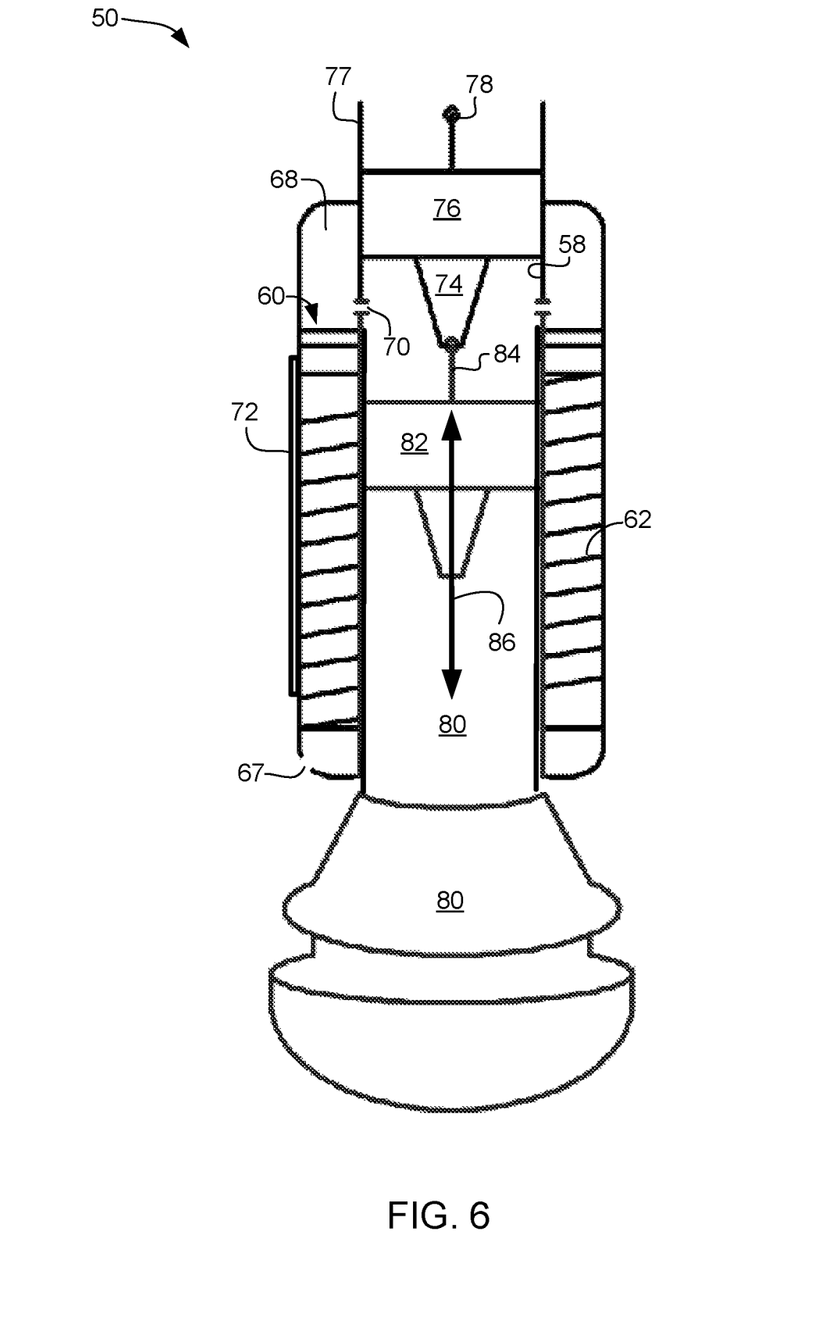
FIG. 6 is a side section view of the valve stem assembly of FIG. 5 with a valve stem.

Referring now also to FIG. 6 in the drawings, a side section view of valve stem assembly 50 is located over a valve stem 80. Valve stem 80 is a conventional valve stem associated with a tire. In operation, air is selectively passed through the valve body 82 of the tire stem by depressing the stem cap 84 of the tire stem. Air may be forced into the tire or removed when the stem cap of the tire is depressed. The flow of air may be in the directions illustrated in arrows 86.

The operation of valve stem assembly 50 is visible in FIG. 6. As noted previously, assembly 50 is configured to replace existing valve stem caps that merely cover stem tip 84. Assembly 50 is configured to threadedly engage the exterior of the valve stem 80 with threads 57 on threaded surface 58, such that valve stem 80 passes into internal section 56. When fully engaged and tightened, cap stem core 74 of assembly 50 presses down upon stem cap 84 of the tire stem 80 so as to set stem cap 84 into an open position. Stem tip 78 can therefore still compress within valve core 54 to regulate airflow into and out of the tire despite the stem tip 84 being open. Installation of assembly 50 on tire stem 80 maintains the valve stem in an open position. As air is introduced into internal section 56 through valve body 76, the air pressure is equalized between the air pressure in the tire and the air in void space 68.

Ports 70, will allow the pressure in the cap and tire to be at same level at all times. Assembly 50 further includes an aperture 67 below plunger 60 adjacent to spring 62 between or within either of walls 64 and 66. Aperture 67 is configured to maintain the void space below plunger 60 at atmospheric pressure. Pressure within the tire or within internal section n56 pushes the pressure marking plunger 60 against the compression spring 62. By balancing the forces on the pressure marking plunger 60 from the inside pressure and the spring 62, the displacement of the pressure marking plunger 60 will indicate the correct relative pressure inside the tire with respect to atmospheric pressure. Based on the readings, the consumer can inflate or deflate the tire as per their needs.

Figure 7:
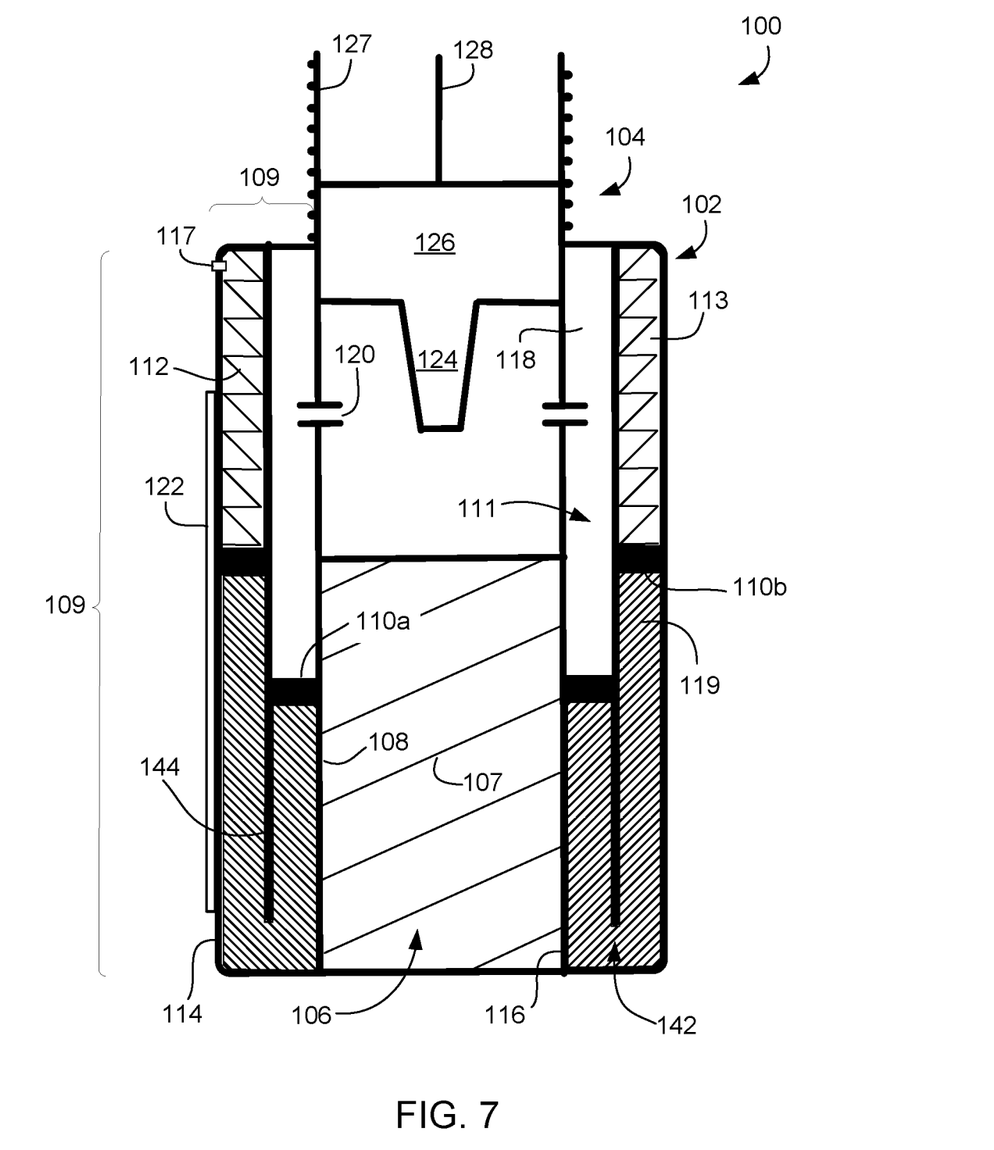
FIG. 7 is a side section view of an alternate embodiment of the valve stem system of FIGS. 1, 2, and 5.
Figure 8:
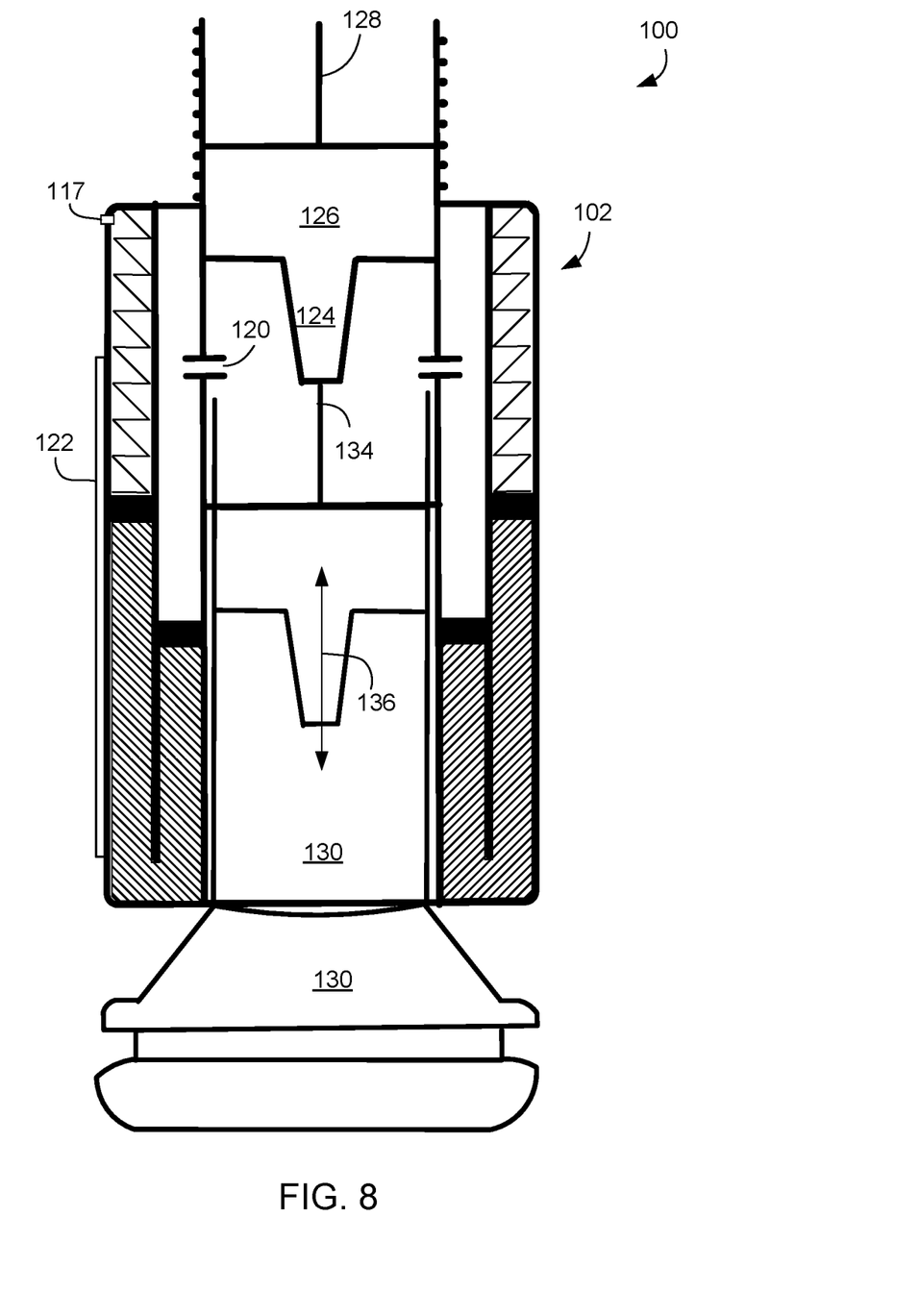
FIG. 8 is a side section view of the valve stem assembly of FIG. 7 with a valve stem.

Referring now also to FIGS. 7 and 8 in the drawings, a side section view of valve stem assembly 100 is illustrated. Valve stem assembly 100 is configured to fit over and around a valve stem on a tire. The tire can be any such tire, namely those associated with an internal inner-tube (i.e. bicycles) or tires that are tubeless (i.e. automobiles). Assembly 100, along with assembly 50, are configured to be placed over the existing valve stem and optionally remain in contact during use, such as driving or riding. A user is able to view the tire pressure within the tire at any time via some type of observations, such as visual, audible, or physical sensory touch. Assembly 100 is configured to provide an engagement area that is designed to mirror that of the tire valve stem to permit subsequent filling and releasing of air from the tire through assembly 100. This feature is equally applicable to the other designs depicted and described herein.

As noted above, assembly 100 is configured to replace, or act as an extension of the valve stem. Assembly 100 is configured to provide a continuous reading of tire pressure within the tire. This pressure is observable to a user at any time. Assembly 100 acts to assist older vehicles that are not equipped with original equipment install parts within their cars to monitor tire pressure. The approach of the present application makes the pressure monitoring of tires easy and accessible to the consumer without having to purchase expensive new vehicles or an elaborate monitoring system that is still not linked to the computer of the car. Assembly 100 obtains a mechanical reading of the tire pressure and is easily installed by merely screwing or coupling it to the tire stem.

Assembly 100 is similar in form and function to that of assembly 50. Assembly 100 is configured to provide a continuous visual indication of the pressure within the tire. Assembly 100 is also configured to engage an exterior portion of the core of the tire stem so as to maintain the core in an open position. Assembly 100 provides for the regulation of air through the tire stem via a cap stem core.

Assembly 100 includes a pressure sensing body 102 and a valve core 104. Pressure sensing body 102 includes an internal hollowed section 106 with an internal threaded surface 108. Surface 108 is configured to engage corresponding external threads from a tire stem, similar to that of the threads typically found in a tire stem cap (not shown). The particular height of, or amount of coverage of, threads 107 along surface 108 is determined by the threads on the tire stem.

Body 102 further includes a pressure detecting area 109 configured to communicate with the pressure in the tire and provide a reading to a user. Area 109 wraps around the circumference of assembly 100 such that two internal hollowed cylinders are formed, namely an inner cylinder 111 and an outer cylinder 113. Cylinders 111 and 113 are open to one another at a bottom section 142 and are divided via a divider 144 via a shared wall. Each cylinder is a volume of space layered between inner wall 116 and outer wall 114. Area 109 is configured to utilize both a mechanical biasing element and a fluid to indicate the tire pressure. Area 109 includes a pressure marking plunger 110a within the inner cylinder 111 and a pressure marking plunger 110b in the outer cylinder 113. Fluid is located between plungers 110a and 110b. Opposite the fluid adjacent plunger 110b is a mechanical compression spring 112.

Body 102 also includes at least one internal port 120 passing through portions of inner wall 116 so as to allow equalized fluid communication between internal section 106 and a void space 118. Void space 118 is opposite the fluid about plunger 110a within inner cylinder 111. Port 120 is configured to remain an open passage that is not obstructed. Air pressure within internal section 106 should be equal to air pressure within void space 118 upon mating assembly 100 with the valve stem. It is understood that port 120 may form a slit around a portion of the circumference of inner wall 116 and is not limited to a small circular hole.

Spring 112 is located above plunger 110b within the outer cylinder 113, plunger 110a being located in the inner cylinder 111. Plungers 110a and 110b act to create a seal within cylinders 111 and 113 to prevent fluid leaking into void space 118 and the volume consumed by spring 112. Body 102 may further include a pressure relief port 117 similar to that of aperture 67. Port 117 is configured to maintain the volume of air around spring 112 at an atmospheric air pressure. If not for port 117, translation of plunger 110b into spring 112 would also have to fight to compress the air adjacent spring 112. Port 117 allows air to exhaust out and selectively return into the void space around spring 112. Spring 112 is located in an upper portion of outer cylinder 113 and is used to bias or reset the location of plunger 110b (also therefore 110a) when no forced air is found within volume 106.

When seated on a valve stem, assembly 100 will permit an equalization of pressure within the tire with the air in void space 118. This occurs as a result of ports 120 and that assembly 100 presses down and opens the valve of the valve stem when fully seated on the valve stem. The internal pressure pushes down on plunger 110a causing it to translate downward within inner cylinder 111. The fluid 119 pushes plunger 110b upward against spring 112. Although shown in the figures as each cylinder 111 and 113 having an identical area or volume, it is understood that the volumes of each may be different from one another to allow for unequal movement between the plungers. For example, a larger outer cylinder 113 may move the corresponding plunger more slowly compared to the movement of the smaller inner cylinder plunger. Selection of the sizing of cylinders 111 and 113 can be had to allow for more or less detailed accuracy of pressure readings.

Body 102 may optionally include a viewing pane 122 in communication with outer wall 114. Pane 122 is a clear or semi-clear material (i.e. transparent) that permits light to pass through itself to enable viewing the position of plunger 110b. Pane 122 may include internal or external markers (similar to numbers 28 and marks 30) to indicate corresponding air pressure within internal section 106 and void space 118 from the position of plunger 110b. In some embodiments, outer wall 114 will be formed from a transparent material negating the need of a separate pane 122.

Valve core 104 is coupled to an upper portion of body 102, above internal section 106. Valve core 104 includes a cap stem core 124, a valve body 126 and a stem tip 128. Valve core 104 is configured to mirror or replicate the internal workings of the tire stem to some degree. The operation of valve core 104 is such that external tools may be attached to or engaged with the external threaded upper portion of core 104 to release or insert air into internal section 106. Valve core 104 includes wall 127 that extends upward to surround a portion of stem tip 128. The outer surface of wall 127 may be threaded to facilitate the optional attachment of tools or caps. Wall 127 also extends above body 102 and valve body 126.

Cap stem core 124 is configured to extend below valve body 76 into internal section 106. Cap stem core 124 is configured to be partially rigid in that compressive forces acting upward through internal section 106 do not compress it toward valve body 126. Any number of internal valve seats, passages, or ports may be included within cap stem core 124 to allow for the selective flow of air through valve body 126 into internal section 106. Stem tip 128 extends above valve body 126 and passes there through a portion of valve body 126. Compression of stem tip 128 into valve body 126 permits the passage of air through valve body 126 such that the air in internal section 106 is in fluid communication with the air exterior to valve body 126, above stem tip 128.

Referring now in particular to FIG. 8 in the drawings, a side section view of valve stem assembly 100 is located over a valve stem 130. Valve stem 130 is a conventional valve stem associated with a tire and is similar in form and function to valve stem 80. In operation, air is selectively passed through the valve body of the tire stem by depressing the stem cap 134 of the tire stem. Air may be forced into the tire or removed when the stem cap of the tire is depressed. The flow of air may be in the directions illustrated in arrows 136.

As noted previously, assembly 100 is configured to replace existing valve stem caps that merely cover stem cap 134. Assembly 100 is configured to threadedly engage the exterior of the valve stem 130 with threads 107 on threaded surface 108, such that valve stem 130 passes into internal section 106. When fully engaged and tightened, cap stem core 124 of assembly 100 presses down upon stem cap 134 of the tire stem 130 so as to set stem cap 134 into an open position when assembly 100 is fully seated about valve stem 130. Stem tip 128 can therefore still compress independent from stem cap 134 within valve core 104 so as to regulate airflow into and out of the tire despite the stem cap 134 being open. By having stem cap 134 continually open, a continuous air pressure reading can be observed through pane 122. Installation of assembly 100 on tire stem 130 maintains the stem cap 134 in an open position. As air is introduced into internal section 106 through valve body 126, the air pressure is equalized between the air pressure in the tire and the air in void space 128. Ports 120 will allow the pressure in the cap and tire to be the same at all times.

In summary, the devices of the present application are secured to the male threaded end of a tire valve stem by the internal female threats equipped on the assembly thereby allowing both to be coupled together. The assemblies comprise a valve core which will compress the tire stem cap allowing for air now between the tire stem and the assembly. The assemblies may include a single inner cylinder or multiple layered cylinders. One or more plungers may be used to seal within the cylinders. The fluid 119 may be non-compression fluid configured to store light energy (i.e. glow in the dark liquid) to aid in visualizing the pressure level through the pane or wall 114 under low light conditions. Additionally, the plunger adjacent the pane may be colored or be configured to store light energy so as to have glow in the dark capabilities. Markings or numbers may be engraved or extruded vertically around the circumference and along the external portion of the outer wall. A port will be introduced at the top end where spring is located to maintain atmospheric pressure.

The internal PSI reading of the tire is determined by balancing the force inside the tire, seals, liquid and spring with respect to the atmospheric pressure. When the valve core compresses the core on the tire valve stem, air is introduced to the assembly and comes into contact with the inner plunger, which in turn forces movements of the liquid between the cylinders. As a result the second plunger compresses the spring. At the meniscus of the liquid will be aligned with the calculated PSI reading which now reflect the internal pressure of the tire, the glow in the dark liquid and glow in the dark marking will make reading pressure at low ambient light possible.

The current application has many advantages over the prior art including at least the following: (1) continuous monitoring and measurement of air pressure in the tire; (2) ability to cap the valve stem and fill/release air from the tire without removal of the valve stem assembly; (3) safe, fast, and easy to operate; and (4) maintain the open nature of the tire stem when the valve stem assembly is installed.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A valve stem assembly, comprising:
   a pressure sensing body configured to measure and indicate an air pressure, the pressure sensing body having:
      a cylindrical shape with a central internal hollowed section;

an inner cylinder having a first plunger, the inner cylinder configured to surround a portion of the hollowed section, the inner cylinder including a port to permit fluid communication between the hollowed section and a portion of the inner cylinder; and an outer cylinder having a second plunger, the outer cylinder radially coupled to an outer portion of the inner cylinder, the outer cylinder in fluid communication with the inner cylinder;

a fluid located between the first plunger and the second plunger, the fluid passing between both the inner cylinder and the outer cylinder as pressure changes within the hollowed section; and a valve core coupled to the pressure sensing body and covering the internal hollowed section, the valve core configured to regulate pressure inside the internal hollowed section uniformly through the inner and outer cylinders.

2. The assembly of claim 1, wherein the valve core includes a valve body, a cap stem core, and a stem tip, the cap stem core located beneath the valve body and the stem tip located above the valve body.

3. The assembly of claim 2, wherein the stem tip is configured to regulate airflow through the valve body and into the internal hollowed section of the pressure sensing body.

4. The assembly of claim 2, wherein depression of the stem tip into the valve body opens fluid communication through the valve body.

5. The assembly of claim 1, further comprising:
a viewing pane in communication with an outer wall of the outer cylinder, the viewing pane is at least partially transparent so as to permit observation of the pressure level in the internal hollowed section.

6. The assembly of claim 5, wherein the viewing pane is configured to provide markings to indicate the air pressure within the internal hollowed section.

7. The assembly of claim 1, wherein the volume of the inner cylinder is different from the volume of the outer cylinder.

8. The assembly of claim 1, further comprising:
a spring within the outer cylinder to press against the second plunger, the spring and the air pressure in the hollowed section act upon the first and second plunger.

9. The assembly of claim 8, wherein pressure changes in the hollowed section cause the first plunger and the second plunger to translate within the respective cylinder.

10. A valve stem assembly, comprising:
a tire valve stem having a stem cap configured to regulate the transfer of air through the tire valve stem;
a pressure sensing body configured to measure and indicate an air pressure, the pressure sensing body having;
a cylindrical shape with a central internal hollowed section;
an inner cylinder having a first plunger, the inner cylinder configured to surround a portion of the hollowed section, the inner cylinder including a port to permit fluid communication between the hollowed section and a portion of the inner cylinder; and
an outer cylinder having a second plunger, the outer cylinder radially coupled to an outer portion of the inner cylinder, the outer cylinder in fluid communication with the inner cylinder;
a fluid located between the first plunger and the second plunger, the fluid passing between both the inner cylinder and the outer cylinder as pressure changes within the hollowed section; and
a valve core coupled to the pressure sensing body and covering the internal hollowed section, the valve core configured to regulate pressure inside the internal hollowed section uniformly through the inner and outer cylinders;
wherein the pressure sensing body is coupled over and around the tire valve stem, the valve core compressing the stem cap to an open position when the pressure sensing body is seated on the tire valve stem.

11. The assembly of claim 10, wherein the valve core includes a stem tip configured to regulate airflow through the valve body and through the tire valve stem.

12. The assembly of claim 10, further comprising:
a viewing pane in communication with an outer wall of the outer cylinder, the viewing pane is at least partially transparent so as to permit observation of the pressure level in the internal hollowed section.

13. The assembly of claim 12, wherein the viewing pane is configured to provide markings to indicate the air pressure within the internal hollowed section.

14. The assembly of claim 10, wherein the volume of the inner cylinder is different from the volume of the outer cylinder.

15. The assembly of claim 10, further comprising:
a spring within the outer cylinder to press against the second plunger, the spring and the air pressure in the hollowed section act upon the first and second plunger.

16. The assembly of claim 15, wherein pressure changes in the hollowed section cause the first plunger and the second plunger to translate within the respective cylinder.

17. The assembly of claim 15, wherein at least one of the fluid and the second plunger store light energy.

* * * * *